United States Patent
Kubochi et al.

(10) Patent No.: US 8,068,754 B2
(45) Date of Patent: Nov. 29, 2011

(54) IMAGE FORMING APPARATUS EQUIPPED HAVING A HINGE PORTION THAT CONNECTS AN IMAGE FORMING PORTION AND IMAGE READING PORTION

(75) Inventors: Yutaka Kubochi, Mishima (JP); Taisuke Hyodo, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 12/185,360

(22) Filed: Aug. 4, 2008

(65) Prior Publication Data
US 2009/0040545 A1    Feb. 12, 2009

(30) Foreign Application Priority Data

Aug. 6, 2007  (JP) .................................. 2007-204011
Mar. 14, 2008 (JP) .................................. 2008-065847
Aug. 1, 2008  (JP) .................................. 2008-199677

(51) Int. Cl.
*G03G 15/10* (2006.01)
(52) U.S. Cl. ............................................. 399/60; 439/31
(58) Field of Classification Search .................... 399/60; 439/31
See application file for complete search history.

(56) References Cited

U.S. PATENT DOCUMENTS

| | | | |
|---|---|---|---|
| 4,573,756 A * | 3/1986 | Smith et al. ..................... 439/42 |
| 4,796,063 A | 1/1989 | Mitsuyama et al. .......... 355/133 |
| 5,162,846 A * | 11/1992 | Cahill ........................... 399/125 |
| 6,484,016 B1 * | 11/2002 | Cheon .......................... 455/90.1 |
| 6,540,547 B2 * | 4/2003 | Zweigle ........................ 439/468 |
| 6,909,048 B2 * | 6/2005 | Yamanaka et al. ........... 174/68.1 |
| 7,113,721 B2 * | 9/2006 | Kitozaki .......................... 399/88 |
| 7,139,506 B2 | 11/2006 | Park et al. ...................... 399/110 |
| 7,438,588 B2 * | 10/2008 | Rhodes et al. ................ 439/470 |
| 2004/0266239 A1 * | 12/2004 | Kurokawa ..................... 439/165 |
| 2007/0254495 A1 * | 11/2007 | Arndt et al. ..................... 439/31 |
| 2008/0100872 A1 * | 5/2008 | Ito ................................. 358/296 |

FOREIGN PATENT DOCUMENTS

| | | |
|---|---|---|
| JP | 63-127255 | 5/1988 |
| JP | 3-56741 | 3/1991 |
| JP | 11-160942 A | 6/1999 |
| JP | 2000-131907 | 5/2000 |

(Continued)

OTHER PUBLICATIONS

Machine Trnslation of Hisama (JP-2000-131907).*

(Continued)

*Primary Examiner* — David Gray
*Assistant Examiner* — G. M. Hyder
(74) *Attorney, Agent, or Firm* — Fitzpatrick, Cella, Harper & Scinto

(57) ABSTRACT

An image forming apparatus including: an image forming portion for forming an image on a sheet; an image reading portion for reading an original, the image forming portion having a printed board having a projecting board surface projecting on an image reading portion side; a hinge portion having a pivot axis for pivotably supporting the image reading portion relative to the image forming portion; and a cable having a connector to be electrically connected with a connector receiving portion provided on the projecting board surface, wherein, within the image forming apparatus, the cable is folded back in a U-shape in a vicinity of the pivot axis from the image reading portion side to an image forming portion side, with the connector of the cable being connected to the connector receiving portion from a direction substantially perpendicular to the projecting board surface.

10 Claims, 9 Drawing Sheets

FOREIGN PATENT DOCUMENTS

| | | | |
|---|---|---|---|
| JP | 2001-063178 A | | 3/2001 |
| JP | 2001154289 A | * | 6/2001 |
| JP | 2002-246773 A | | 8/2002 |
| JP | 2005-24707 | | 1/2005 |
| JP | 2005-195775 | | 7/2005 |
| JP | 2005-258025 | | 9/2005 |
| JP | 2009069641 A | * | 4/2009 |

OTHER PUBLICATIONS

Explanation of the Relevance of Japanese patent document No. 2000-131907, in English.

* cited by examiner

IMAGE FORMING APPARATUS EQUIPPED HAVING A HINGE PORTION THAT CONNECTS AN IMAGE FORMING PORTION AND IMAGE READING PORTION

BACKGROUND OF THE INVENTION

1. Field of the Invention

The present invention relates to an image forming apparatus having a scanner portion and a printer portion. More specifically, the present invention is applicable to a digital copying machine, a facsimile apparatus, a multifunctional printer (MFP) or the like which is divided into a scanner portion for reading an original and a printer portion for forming an image on a sheet.

2. Description of the Related Art

Conventionally, as an image forming apparatus such as a digital copying machine, a facsimile apparatus, or a multifunctional printer (MFP) formed by combining such an apparatus with a printer, there has been known one which is divided into units including a printer portion and a scanner portion. To facilitate the operation of the scanner portion, the scanner portion is usually installed above the printer portion. The printer portion has an image forming portion for forming an image on a sheet material, and the scanner portion has an image reading portion for reading an image of an original.

In such an image forming apparatus, in order to facilitate operations such as maintenance, sheet jam clearance, and replacement of process cartridges, there is adopted a construction in which the scanner portion, which is on the upper side, is rotated so as to be opened and closed with respect to the printer portion, which is on the lower side.

On the backside of the apparatus, and between the printer portion and the scanner portion, there is provided a cable as a conductor line for transmission and reception of electric signals. One end portion of this cable is connected to a printed board inside the scanner portion, and the other end portion thereof is connected to a printed board inside the printer portion.

Also regarding a copying machine, there is known a construction in which a sheet-through type scanner portion that has an original pressure plate equipped with an automatic document feeder (ADF) for an original is opened and closed with respect to an image forming apparatus main body having a flat bed type scanner. In such a copying machine, electric wires connecting the scanner portion and the printer portion are connected together by a cable on the backside of the apparatus, with the cable being in an exposed state.

When the cable connecting the scanner portion and the printer portion is thus exposed to the exterior of the image forming apparatus, the outward appearance of the apparatus suffers. Further, there is the possibility of the user inadvertently pulling the cable to damage the same.

As a solution to the above-mentioned problems, there is known a construction disclosed, for example, in Japanese Patent Application Laid-Open No. 2005-258025. As illustrated in FIG. 16, the image forming apparatus disclosed in Japanese Patent Application Laid-Open No. 2005-258025 has a scanner portion 100 and a printer portion 102, with the scanner portion 100 being connected to the printer portion via a hinge portion 101 so as to allow opening and closing. Inside the printer portion 102, there is provided, as an image forming unit, a process cartridge 105 including a photosensitive drum 104. Image information read by the scanner portion 100 is written to the photosensitive drum 104 by a laser exposure device as an electrostatic latent image before being developed into a toner image by the process cartridge 105. This toner image is transferred to a sheet material P supplied from a sheet material accommodating cassette 106, and is fixed to the sheet material through pressurization and heating by a fixing device 107. At the time of maintenance, the apparatus is opened by rotating the scanner portion 100 around the hinge portion 101, and access to the interior of the printer portion 102 is allowed through opening portions of the scanner portion 100 and the printer portion 102, thus enabling various operations to be conducted. The scanner portion 100 and the printer portion 102 are electrically connected by a cable 103. The cable 103 is arranged inside a cylindrical member 110 provided in the vicinity of the hinge portion 101, and cables and the like are accommodated in the image forming apparatus.

However, the image forming apparatus disclosed in Japanese Patent Application Laid-Open No. 2005-258025, in which the cable 103 is arranged inside the cylindrical member 110 in the vicinity of the hinge portion 101, involves the following problem.

Since the cable 103 is accommodated in the cylindrical member 110, which is integral with the casing, each time assembling or dismantling of the scanner portion 100 and the printer portion 102 is to be performed, it is necessary to detach the cable 103 from the cylindrical member 110. However, in the small space near the hinge portion 101, it is rather difficult to perform the operation of detaching the cable 103 from the cylindrical member 110. Further, it is necessary to perform the difficult operation of joining and removing components covering the cable 103, resulting in a rather poor workability. It should be noted, in particular, that the printer portion and the scanner portion of an image forming apparatus are formed by a very large number of components. Thus, from the viewpoint of assembly workability, there is a strong demand for a construction which allows connection via a cable of the printer portion and the scanner portion joined together after being respectively assembled as complete units.

SUMMARY OF THE INVENTION

It is an object of the present invention to provide an image forming apparatus which reduces a possibility of a cable between an image forming portion and an image reading portion being damaged, which allows easy access to the cable, and which helps to achieve an improvement in terms of workability in assembly operation and dismantling operation and to facilitate the maintenance.

It is another object of the present invention to provide an image forming apparatus including: an image forming portion for forming an image on a sheet material; an image reading portion for reading an original; a hinge portion for connecting the image reading portion and the image forming portion, wherein the hinge portion has a pivot axis for pivotably supporting the image reading portion so as to allow the image reading portion to be opened and closed relative to the image forming portion; and a cable equipped with a connector for electrically connecting the image reading portion and the image forming portion, wherein the image forming portion has a printed board having a projecting board surface projecting on an image reading portion side, the printed board having a connector receiving portion provided on the projecting board surface and serving to effect connection with the connector of the cable, and wherein, within the image forming apparatus, the cable is folded back in a U-shape in a vicinity of the pivot axis of the hinge portion from the image reading portion side to an image forming portion side, with the connector of the cable being connected to the connector receiving portion from a direction substantially perpendicular to the projecting board surface of the printed board.

It is another object of the present invention to provide an image forming apparatus including: an image forming portion for forming an image on a sheet material; an image reading portion for reading an original; a hinge portion for connecting the image reading portion and the image forming portion, wherein the hinge portion has a pivot axis for pivotably supporting the image reading portion so as to allow the image reading portion to be opened and closed relative to the image forming portion; and a cable equipped with a connector for electrically connecting the image reading portion and the image forming portion, wherein the image forming portion has a printed board having a projecting board surface projecting on an image reading portion side, the printed board having a connector receiving portion provided on the projecting board surface and serving to effect connection with the connector of the cable, and wherein the connector receiving portion provided on the projecting board surface of the printed board is directed horizontally.

It is another object of the present invention to provide an image forming apparatus including: an image forming portion for forming an image on a sheet material; an image reading portion for reading an original; a hinge portion for connecting the image reading portion and the image forming portion, wherein the hinge portion has a pivot axis for pivotably supporting the image reading portion so as to allow the image reading portion to be opened and closed relative to the image forming portion; a cable equipped with a connector for electrically connecting the image reading portion and the image forming portion, wherein the image forming portion has a printed board having a projecting board surface projecting on an image reading portion side, the printed board having a connector receiving portion provided on the projecting board surface and serving to effect connection with the connector of the cable; and a cable cover, which covers the connector receiving portion and an image forming portion side portion of the cable connected to the connector receiving portion and secures a distance between the cable and outside, the cable cover being detachably mountable to the image forming portion, wherein, in a state where the image reading portion is open with respect to the image forming portion, the cable cover can be detached away from the pivot axis of the hinge portion and along the image forming portion side portion of the cable, and wherein, in a state where the image reading portion is closed with respect to the image forming portion, attachment/detachment of the cable cover is prohibited.

Further objects and preferred embodiments of the present invention will now be described in detail in accordance with the accompanying drawings.

DESCRIPTION OF THE EMBODIMENTS

In the following, preferred embodiments of the present invention are described in detail by way of example with reference to the drawings. It should be noted that the dimensions, materials, and shapes of the components described in the embodiments and the relative arrangement thereof should not be construed restrictively unless otherwise specified.

First Embodiment

Figure 1:
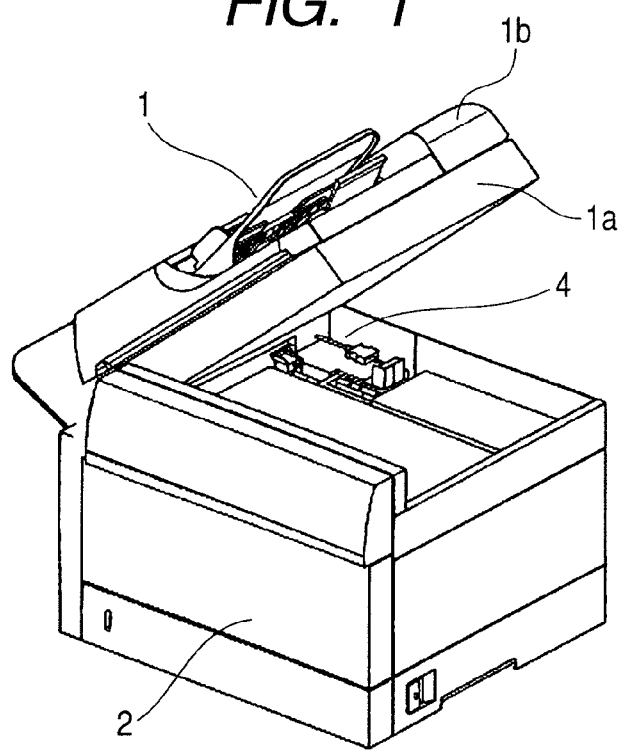
FIG. 1 is a perspective view of the general construction of an image forming apparatus according to a first embodiment.
Figure 2:
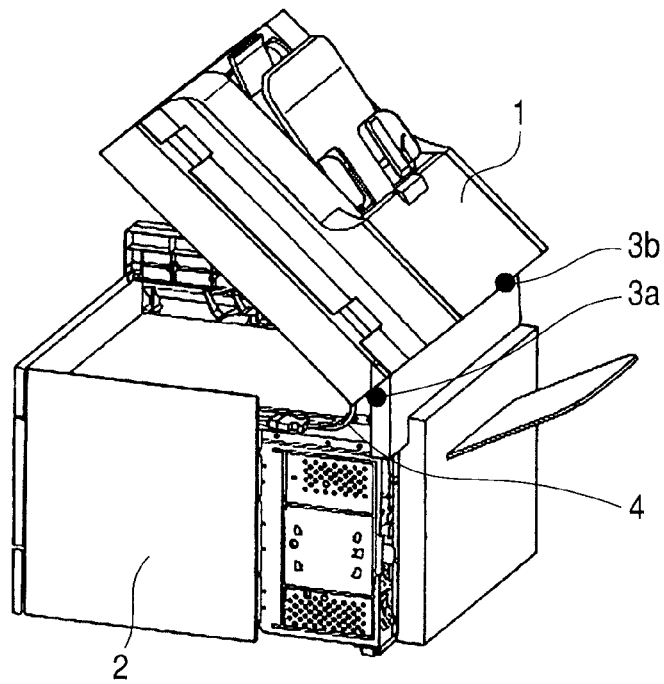
FIG. 2 is a partially cutaway perspective view of the image forming apparatus of FIG. 1 as seen from the opposite side.
Figure 3:
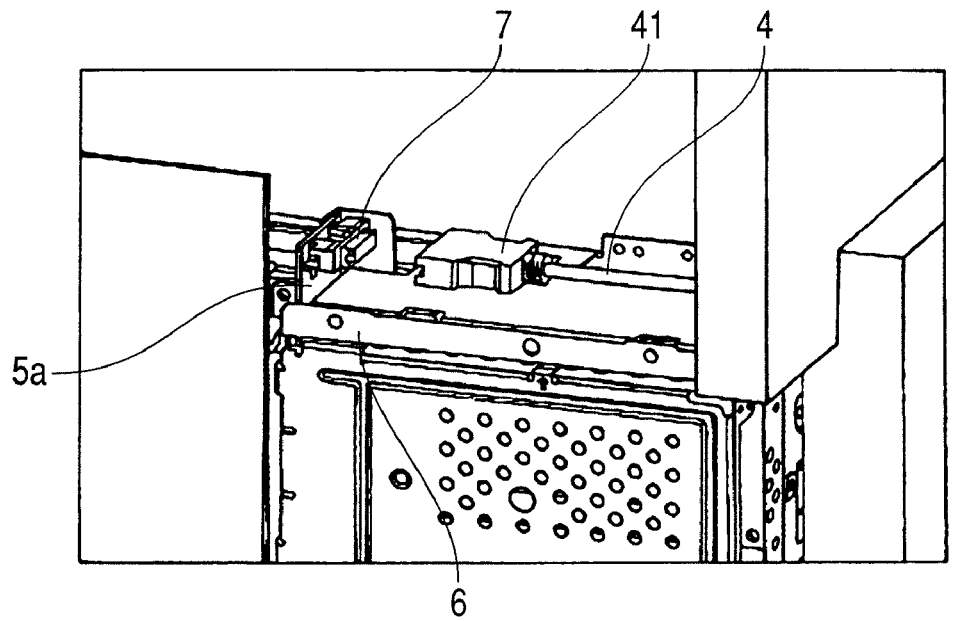
FIG. 3 is an enlarged perspective view of a portion in the vicinity of a connector receiving portion of the image forming apparatus according to the first embodiment.
Figure 16:
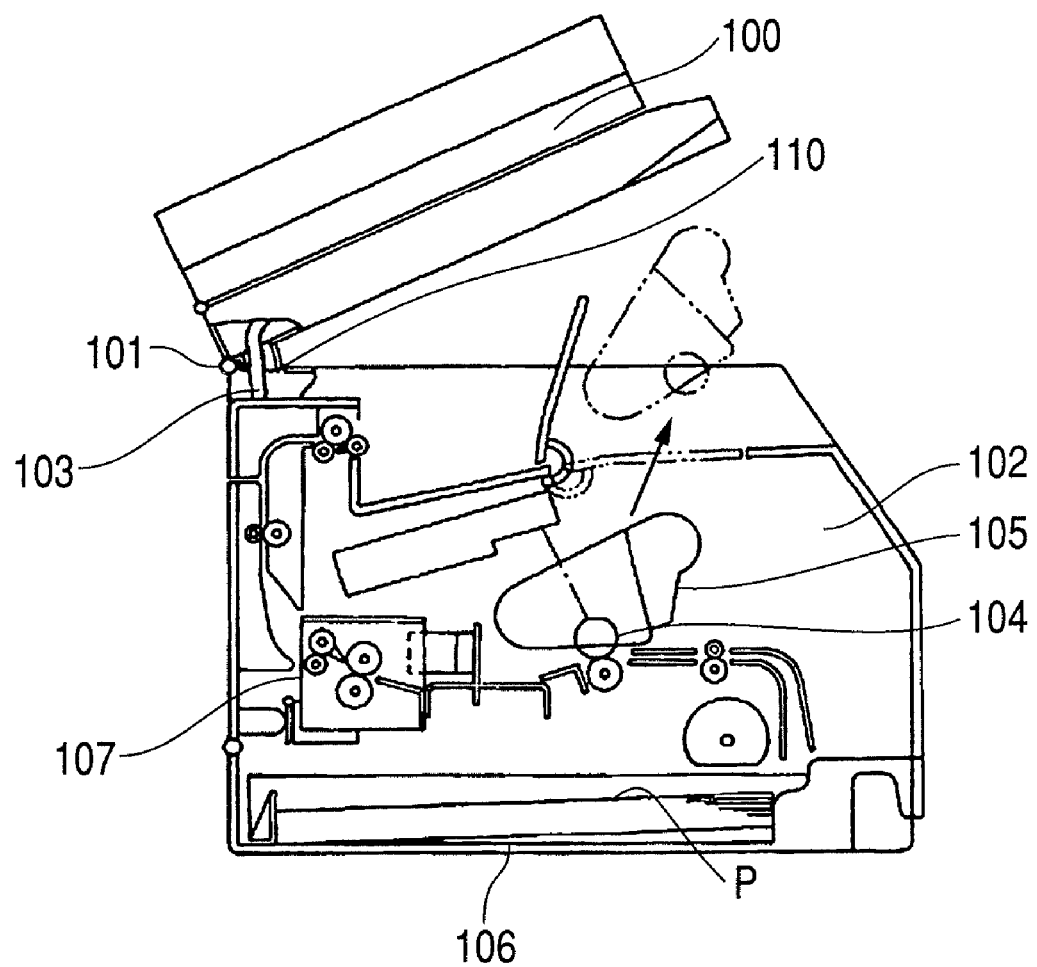
FIG. 16 is a sectional view of a conventional image forming apparatus.

FIG. 1 illustrates a scanner portion 1 of an image forming apparatus according to the preferred first embodiment of the present invention in an open state. FIG. 2 is a rear view of the image forming apparatus of the first embodiment, and FIG. 3 is a partial enlarged view of the same. In FIGS. 2 and 3, a part of the exterior cover on the rear side is removed so that the connector portion can be seen more clearly for describing the first embodiment. Regarding the construction of the interior of the image forming portion of an image forming apparatus to which the present invention is applicable, the construction is the same as the construction of the conventional image forming apparatus illustrated in FIG. 16, so a description thereof is omitted.

In the image forming apparatus illustrated in FIGS. 1, 2, and 3, the scanner portion 1 serving as the image reading portion is arranged on top of a printer portion 2 serving as the image forming portion. The scanner portion 1 is opened and closed by being rotated around hinge portions 3 with respect to the printer portion 2. By opening the scanner portion 1 through relatively upward rotation with respect to the printer portion 2, access to the interior of the printer portion 2 is allowed via an opening portion between the scanner portion 1 and the printer portion 2. When replacement of the process cartridge, jam clearance, etc. are to be performed, the scanner portion 1 is opened upwardly, and access to the interior of the printer portion 2 is allowed via the opening portion between the scanner portion 1 and the printer portion 2.

The scanner portion 1 includes a flat bed type scanner portion 1a and a sheet-through type scanner portion 1b having an automatic document feeder (ADF) on an original pressure plate. The scanner portion 1 are provided so as to be capable of being opened and closed by a predetermined angle around the pivot axes of hinge portions 3*a* and 3*b* with respect to the printer portion 2. While in FIG. 2 the right and left hinge portions are indicated by the different reference symbols 3*a* and 3*b*, in the following description, the subscripts a and b are omitted, and the two hinge portions are simply referred to as the hinge portions 3 unless otherwise specified. The pivot axes of the hinge portions 3 are axes that are horizontal when the printer portion 2 and the scanner portion 1 are installed horizontally. Further, in the vicinity of the hinge portions 3, there is installed a damper mechanism (not shown) supporting the operating/closing motion of the scanner portion.

A cable 4 electrically connects the scanner portion 1 and the printer portion 2 to each other. One end of the cable 4 is connected to a printed board (not shown) provided in the scanner portion 1, and the other end of the cable 4 is connected to a printed board provided in the printer portion 2. As a result, transmission and reception of electric signals are effected between the scanner portion 1 and the printer portion 2, and, for example, image information read by the scanner portion 1 is transmitted to the printer portion 2.

As illustrated in FIG. 3, the printer portion 2 is provided with a connector receiving portion 7. A connector 41 provided at one end of the cable 4 is detachably connected to the connector receiving portion 7. The connector receiving portion 7 is provided on the board surface of a relay board 5 that is a printed board arranged on the backside of the printer portion 2. As illustrated in FIG. 3, the relay board 5 is arranged in the inner portion on the backside of the printer portion 2, and is equipped with a projecting board surface 5*a* a part of which projects upwardly beyond a shield member 6, etc. in the periphery. On the projecting board surface 5*a* of the relay board 5, there is provided the connector receiving portion 7 for connection with the cable 4 so as to be directed toward the hinge portions 3. In the closed state, in which the scanner portion 1 is closed with respect to the printer portion 2, the cable 4, the relay board 5, and the connector receiving portion 7 are accommodated in the image forming apparatus main body. Further, in the open state, in which the scanner portion 1 is opened with respect to the printer portion 2, the connector receiving portion 7 is exposed in the opening portion of the scanner portion 1 and the printer portion 2. Thus, in the open state, it is possible to attach and detach the connector 41 of the cable 4 to and from the connector receiving portion 7 without removing the exterior components and the peripheral components.

Figure 4:
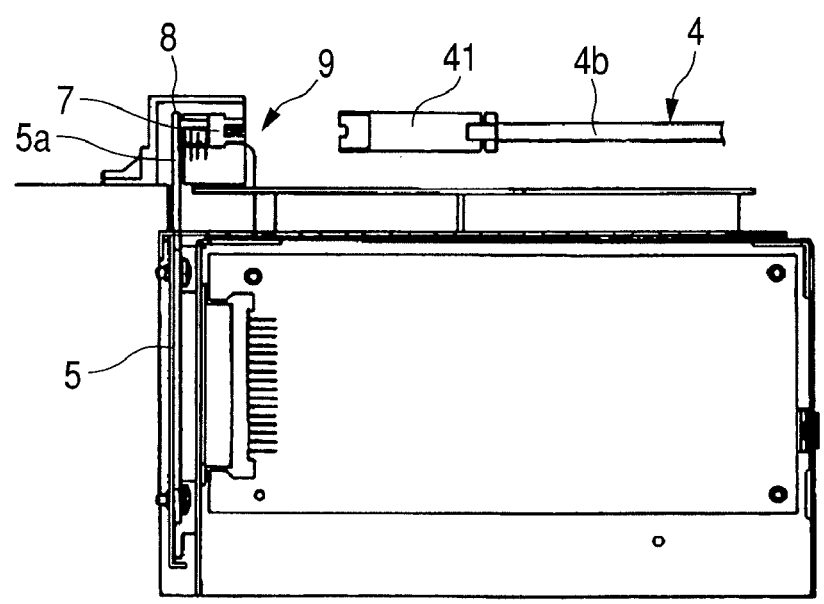
FIG. 4 is a sectional view of the portion in the vicinity of the connector receiving portion of FIG. 3.

FIG. 4 illustrates the region in the periphery of the connector receiving portion 7 provided on the projecting board surface 5*a* of the first embodiment. The projecting board surface 5*a* is provided with a connector cover 8 in order to protect the relay board 5 and the connector receiving portion 7 against contact with some other component and dust at the time of assembly and maintenance. The connector cover 8 is provided with an opening portion 9 opening toward the hinge portions 3 so as not to be an obstacle in attaching and detaching the cable 4 to and from the connector receiving portion 7.

Figure 5:
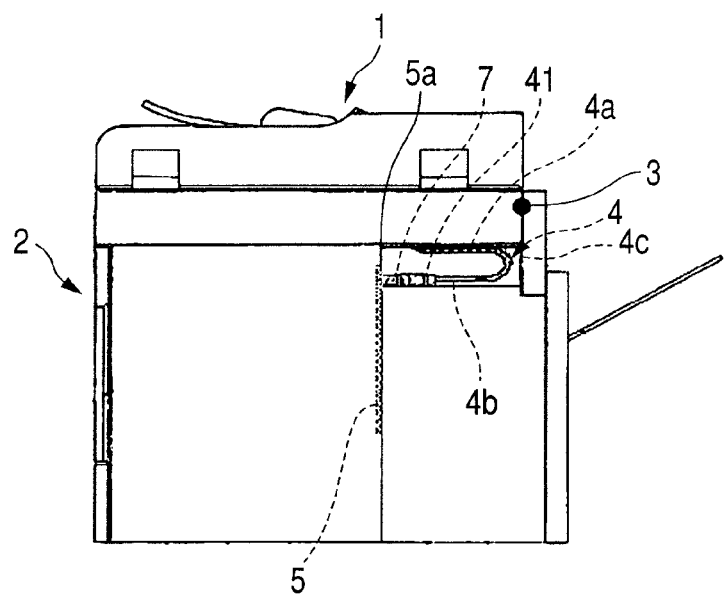
FIG. 5 is a rear view of the image forming apparatus according to the first embodiment in the closed state.
Figure 6:
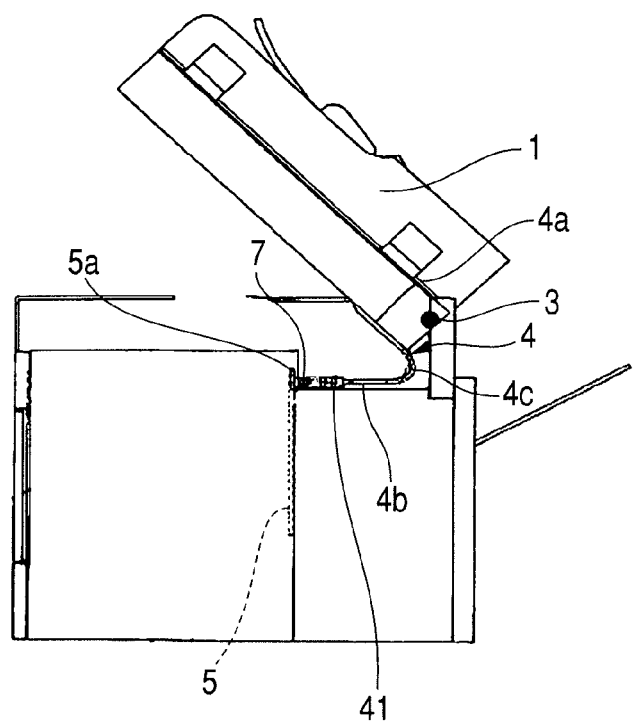
FIG. 6 is a rear view of the image forming apparatus according to the first embodiment in the open state.

Next, the laying of the cable 4 connecting the printer portion 2 and the scanner portion 1 is described. FIG. 5 is a rear view of the image forming apparatus of the first embodiment, with the scanner portion 1 being closed with respect to the printer portion 2, FIG. 6 is a rear view of the same in the open state, and FIG. 7 is a top view of the laying of the cable 4.

The cable 4 is folded back in a U-shape to be divided into a scanner portion side cable portion 4*a*, which constitutes the image reading portion side portion, and a printer portion side cable portion 4*b*, which constitutes the image forming portion side portion, in the vicinity of the hinge portion 3 around which the scanner portion 1 rotates, and on the inner side of the image forming apparatus 1A. The printer portion side cable portion 4*b* of the cable 4 is arranged so as to be away from the pivot axis of the hinge portion 3 and to reach the connector receiving portion 7. The scanner portion side cable portion 4*a* is also arranged so as to be away from the pivot axis of the hinge portion 3, and is connected to the connector receiving portion provided in the scanner portion 1. However, the wiring arrangement of the cable portion 4*a* on the scanner portion side is not restricted to the above-mentioned one, and any type of wiring arrangement will do as long as the cable portion 4 is folded back in the vicinity of the pivot axis of the hinge portion 3.

The cable portion 4*b* on the printer portion 1 side is inserted from a direction substantially perpendicular to the connector receiving portion 7 provided on the projecting board surface 5*a* of the relay board 5, and extends horizontally toward the pivot axis of the hinge portion 3 around which the scanner portion 1 rotates. Further, the cable 4 changes its orientation by 180 degrees at a fold-back portion 4*c* in the vicinity of the inner side of the hinge portion 3 constituting the rotation center, and leads to the cable portion 4*a* on the scanner portion side. The cable portion 4*a* on the scanner portion side also extends away from the hinge portions 3 along the bottom surface constituting the division surface of the scanner portion 1. Further, a connector 42 on the scanner portion side is connected to a printed board such as a control board (not shown) in the scanner portion 1. In this way, the cable 4 is connected from a direction substantially perpendicular to the projecting board surface 5*a* of the relay board 5 of the printer portion 2, thereby reducing the possibility of the cable 4 being inadvertently caught to suffer damage when the scanner portion 1 is opened and closed with respect to the printer portion 2, and efficient wiring is possible, allowing the cable 4 to be short. Further, by arranging the cable 4 parallel to the upper surface of the printer portion 2, it is possible to minimize the requisite vertical space for the laying of the cable 4.

Figure 7:
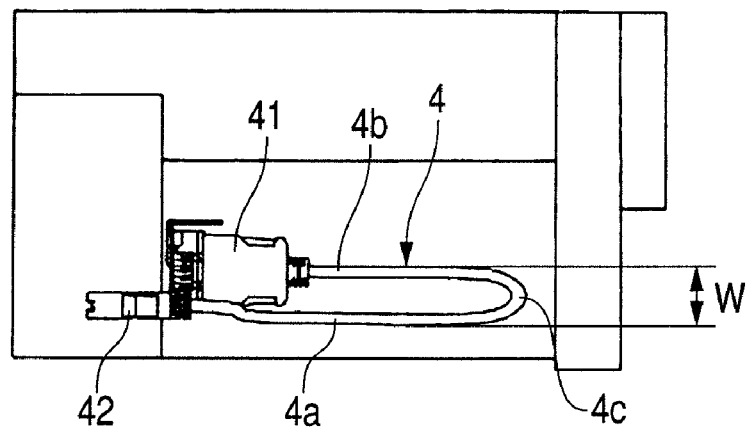
FIG. 7 is a top view illustrating the cable laying structure of the image forming apparatus according to the first embodiment.

As illustrated in FIG. 7, the cable 4 is connected to the relay board 5 of the printer portion 2 by the connector 41 at one end thereof. Further, the cable 4 is connected to a control board (not shown) of the scanner portion 1 by the connector 42, which is provided at the other end thereof.

In order that the scanner portion side cable portion 4*a* and the printer portion side cable portion 4*b* of the cable 4 may not overlap each other in the vertical direction, the hinge portions 3 may be positionally deviated, that is, offset, in the pivot axis direction. In this embodiment, the pivot axis direction of the hinge portion 3 corresponds, when viewed from the viewpoint of the way the apparatus is used by the user, to the front-back direction. The offset amount (W) can be set as appropriate to an optimum value based on the dimensions of the printer portion 2 and the scanner portion 1.

By folding back the cable 4 in an offset state, it is possible to achieve space saving in the vertical direction. Further, when opening or closing the scanner portion 1 with respect to the printer portion 2, it is not only possible to bend the cable 4 but also to twist the cable 4, and hence it is possible to reduce the stress applied to the cable 4 when the scanner portion 1 is opened and closed repeatedly.

As described above, in the image forming apparatus in which the scanner portion 1 can be relatively opened and closed with respect to the printer portion 2 and in which the printer portion 2 and the scanner portion 1 are electrically connected to each other, the cable 4 is folded back in a U-shape, in the vicinity of the pivot axis of the hinge portion 3, from the image reading portion side to the image forming portion side, and the connector 41 of the cable 4 is connected to the connector receiving portion 7 from a direction substantially perpendicular to the projecting board surface 5a of the relay board 5 of the printer portion 2. As a result, it is possible to reduce the possibility of the cable 4 being inadvertently caught at the time of opening/closing of the scanner portion 1 with respect to the printer portion 2 to suffer damage, and it is possible to effect wiring efficiently so as to reduce the requisite length of the cable 4.

Further, the connector receiving portion 7 provided on the projecting board surface 5a of the relay board 5 is directed horizontally. As a result, as compared with the case in which the connector receiving portion 7 is directed vertically, it is possible to match the length direction of the connector 41 of the cable 4 connected to the connector receiving portion 7 with the horizontal direction, whereby it is possible to reduce the vertical space by just that much in the image forming apparatus.

Further, the connector receiving portion 7 is directed toward the hinge portions 3, whereby it is possible to minimize the requisite vertical space for the laying of the cable.

Further, the cable 4 is folded back while offset in the front-back direction of the image forming apparatus, whereby it is possible to achieve space saving in the vertical direction. Further, when opening/closing the scanner portion 1, it is not only possible to bend the cable 4 but also to twist the cable 4, and hence it is possible to reduce the stress applied to the cable 4 when the scanner portion is repeatedly opened and closed.

The above-mentioned preferred embodiment of the present invention should not be construed restrictively, and the present invention allows various modifications based on the technical idea thereof.

For example, while in the above-mentioned first embodiment, the scanner portion 1 is provided on top of the printer portion 2 so as to allow opening and closing of the scanner portion 1, it is also possible to adopt a relatively reversed construction without departing from the technical idea of the present invention. That is, it is also possible to arrange the printer portion 2 on top of the scanner portion 1.

Second Embodiment

Figure 8:
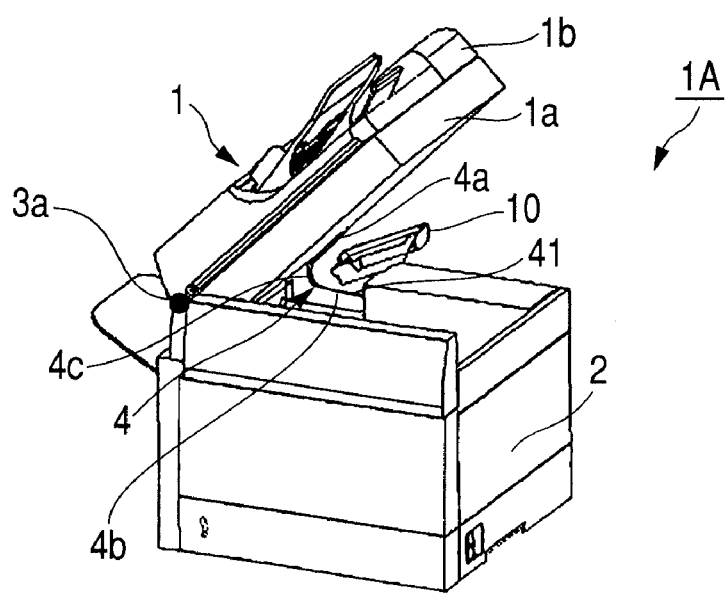
FIG. 8 is a perspective view of the general construction of an image forming apparatus according to a second embodiment.
Figure 9:
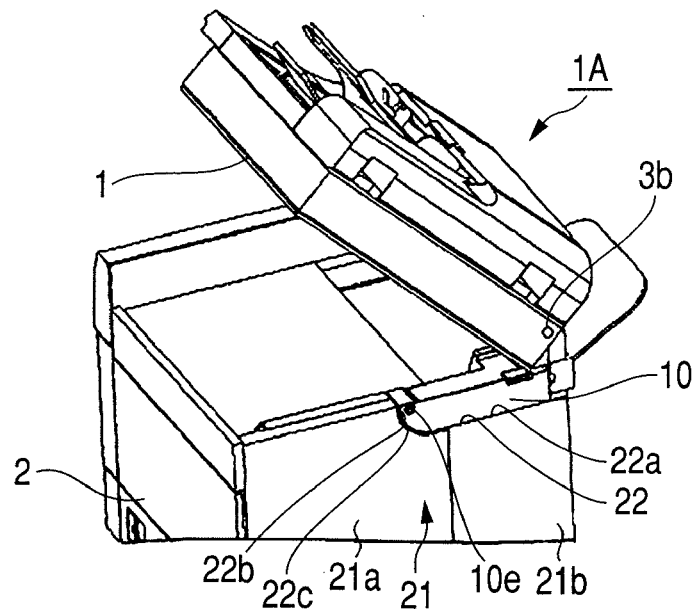
FIG. 9 is a partially cutaway perspective view of the image forming apparatus of FIG. 8 as seen from the rear side.
Figure 12:
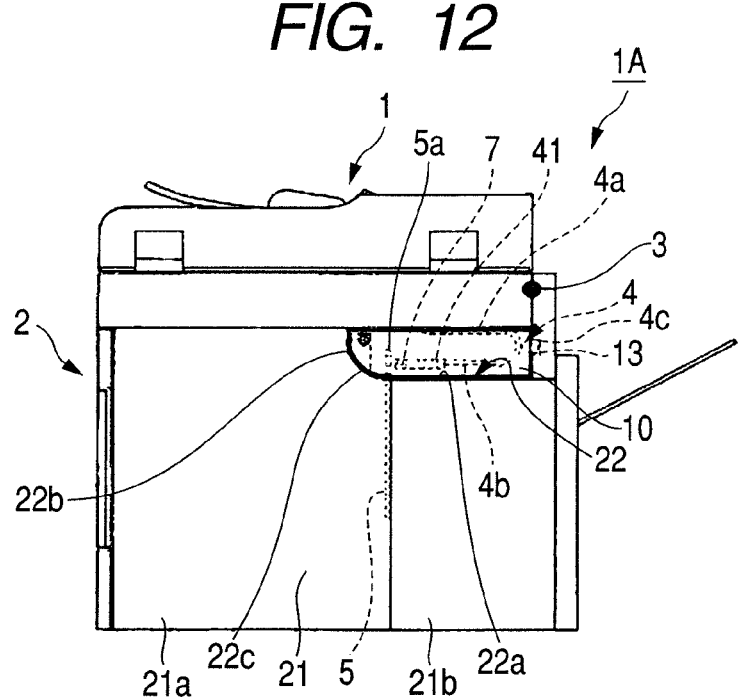
FIG. 12 is a rear view of the image forming apparatus according to the second embodiment in the closed state.
Figure 13:
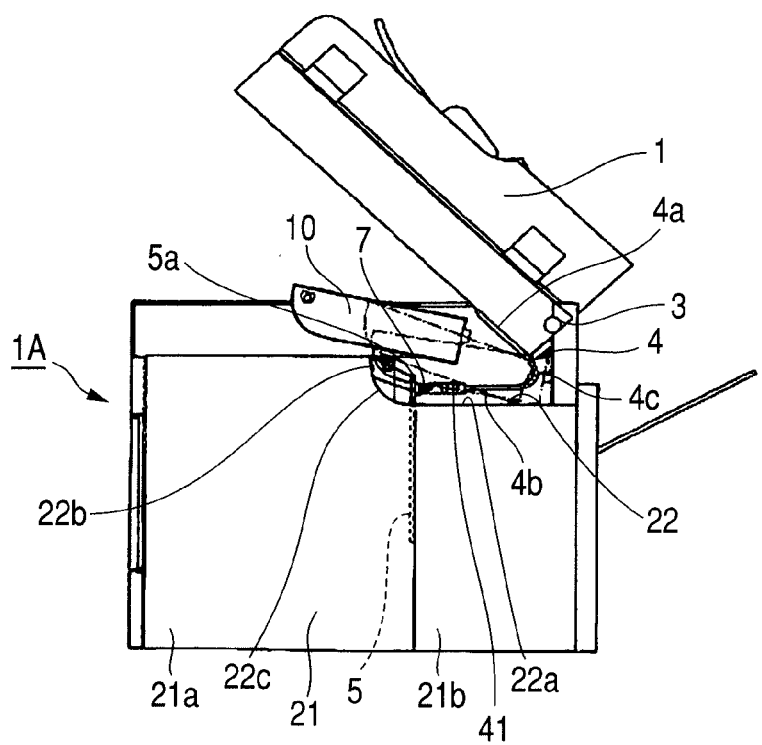
FIG. 13 is a rear view of the image forming apparatus according to the second embodiment in the open state.

FIGS. 8, 9, 12, and 13 illustrate the basic construction of an image forming apparatus according to the second embodiment of the present invention. FIG. 8 is a perspective view of the general construction of the image forming apparatus of the preferred second embodiment of the present invention, FIG. 9 is a partially cutaway perspective view of the image forming apparatus of FIG. 8 as seen from the rear side, FIG. 12 is a rear view of the image forming apparatus of FIG. 8 in the closed state, and FIG. 13 is a rear view of the image forming apparatus of FIG. 8 in the open state. The components that are the same as components of the first embodiment are designated by the same reference symbols, and a description thereof is omitted.

In FIGS. 8 and 9, symbol 1A designates the image forming apparatus as a whole, and the image forming apparatus 1A has the scanner portion 1 as the image reading portion for reading the original, and the printer portion 2 as the image forming portion for forming the image on the sheet material. This embodiment is characterized in that a cable cover 10 covering the connector receiving portion 7 and the cable 4 is detachably provided in the printer portion 2. In this embodiment, the cable cover 10 covers the portion of the cable 4 extending from the scanner portion 1 to the connector receiving portion 7, that is, the cable cover 10 covers the fold-back portion 4c and the printer portion side cable portion 4b. When the connector receiving portion 7 is covered with a connector cover 8 as illustrated in FIG. 10, the cable cover 10 covers the whole including the connector cover 8.

As illustrated in FIG. 12, in the closed state, in which the scanner portion 1 is closed with respect to the printer portion 2, the cable 4, the projecting board surface 5a of the relay board 5, and the connector receiving portion 7 are covered with the cable cover 10, and are accommodated in the image forming apparatus 1A. At this time, the attachment/detachment of the cable cover 10 with respect to the printer portion 2 is prohibited. Thus, in the closed state, it is possible to secure the requisite distance between the cable 4 and the external space by the cable cover 10, thereby preventing damage of the electrical components due to static electricity.

As illustrated in FIG. 13, in the open state attained by opening the scanner portion 1 with respect to the printer portion 2, the cable cover 10 becomes detachable with respect to the printer portion 2. Thus, in the open state, solely by detaching the cable cover 10, it is possible to attach and detach the cable 4 with respect to the connector receiving portion 7 without removing other exterior components and peripheral components.

Figure 10:
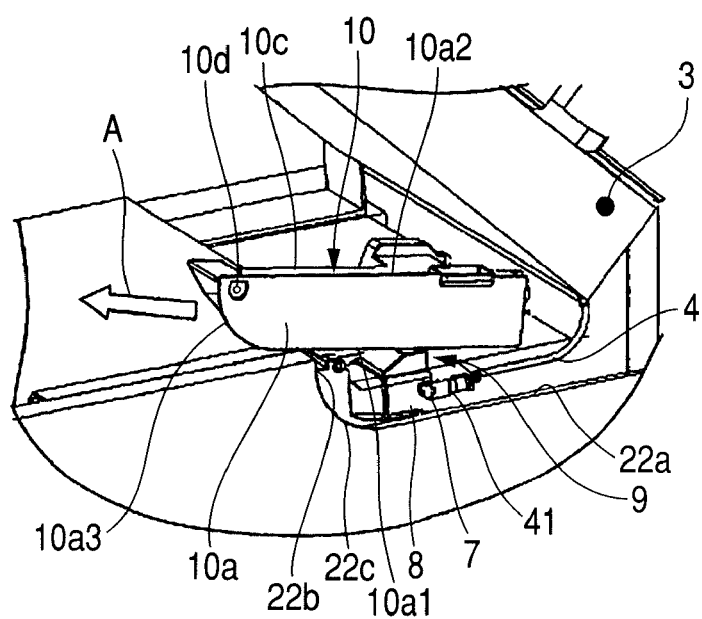
FIG. 10 is a partial perspective view illustrating how a cable cover is detached away.
Figure 11A:
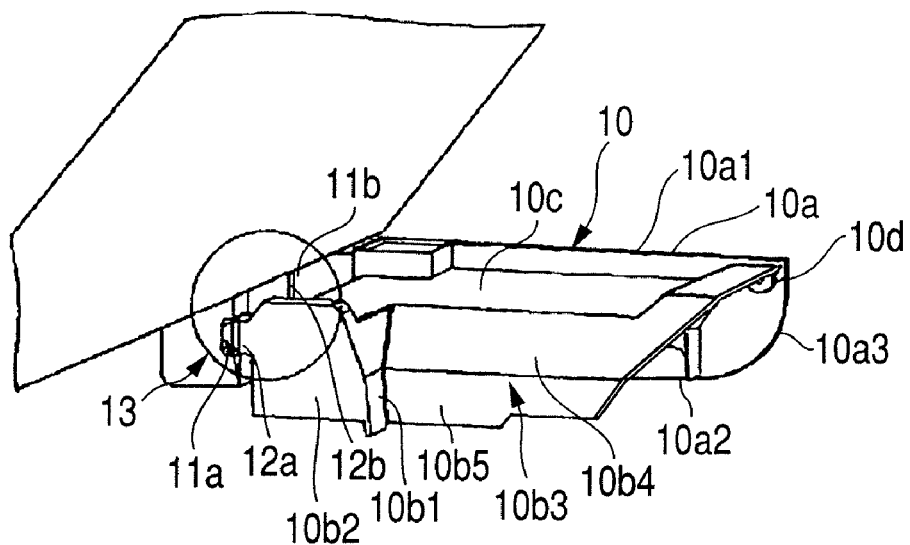
FIG. 11A is a perspective view of the cable cover of FIG. 10 as seen from the opposite side.

FIG. 10 is a partial perspective view illustrating how the cable cover 10 is detached, and FIG. 11A is a perspective view of the cable cover 10 as seen from the opposite side.

The cable cover 10 is equipped with an external plate portion 10a, an internal plate portion 10b provided at a predetermined distance from the external plate portion 10a, and a top plate portion 10c connecting the upper edge portions of the external plate portion 10a and the internal plate portion 10b.

The distance between the external plate portion 10a and the internal plate portion 10b of the cable cover 10 is set to the distance allowing accommodation of the connector cover 8 covering the connector receiving portion 7. The height of the cable cover 10 is set to be large enough to cover the fold-back portion 4c of the cable 4.

The cable 4 is arranged in a one-sided fashion on the backside of the apparatus to which the printed board is attached, and, as illustrated in FIGS. 9, 10, and 12, the external plate portion 10a of the cable cover 10 also serves as a part of a rear cover 21 constituting the exterior of the image forming apparatus.

In this embodiment, there is provided, at the upper end of the rear cover 21 of the printer portion 2, a cutout 22 corresponding to the cable cover 10. The cutout 22 has a horizontal end edge 22a, a connector side vertical end edge 22b, and an arcuate end edge 22c connecting the horizontal end edge 22a and the vertical end edge 22b with each other.

The rear cover 21 is divided into right and left covers 21a and 21b, and the cutout 22 is provided so as to stretch over the right and left covers 21a and 21b. The external plate portion 10a of the cable cover 10 is fitted into the cutout 22, and the surface of the external plate portion 10a of the cable cover 10 is substantially flush with the surface of the rear cover 21.

The external plate portion 10a is a laterally elongated rectangular plate-like portion extending in a direction orthogonal to the hinge portions 3, and a connector side end edge 10a3 thereof includes a vertical end edge and an arcuate end edge extending arcuately from the vertical end edge. The connector side end edge 10a3 is in contact with or in close proximity to the vertical end edge 22b and the arcuate end edge 22c of the cutout 22.

In the vicinity of the upper end portion of the connector side end edge 10a3 of the external plate portion 10a, there is provided a fixation screw hole 10d. In this example, the fixation screw hole 10d is provided near the corner defined by the connector side end edge 10a3 and the upper side edge 10a1.

The internal plate portion 10b is divided into a hinge portion side portion 10b2 and a connector side portion 10b3 via a bent portion 10b1, with the hinge portion side portion 10b2 protruding inwardly beyond the connector portion side portion 10b3. The upper half 10b4 of the connector portion side portion 10b3 constitutes an inclined surface inclined such that the distance from the external plate portion 10a increases gradually downwards, and the lower half 10b5 thereof constitutes a vertical surface.

When the scanner portion 1 is closed, the cable portion 4a on the scanner portion side that is folded back is accommodated so as to extend along the upper surface of the top plate portion 10c.

The cable cover 10 is supported with respect to the printer portion 2 so as to be movable away from the pivot axes of the hinge portions 3 constituting the rotation center of the scanner portion 1, with the scanner portion 1 being open. In this embodiment, between the cable cover 10 and the printer portion 2, there are provided insertion engaging portions 13 to be detached from each other through movement of the cable cover 10 away from the pivot axis of the hinge portion 3. The insertion engaging portions 13 are engaged with each other through movement of the cable cover 10 toward the pivot axis of the hinge portion 3.

Figure 11B:
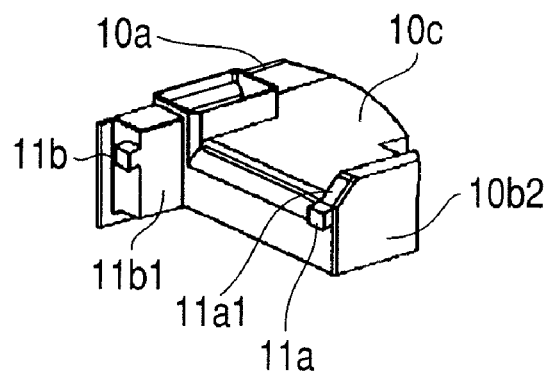
FIG. 11B is an enlarged partial perspective view of FIG. 11A.

As illustrated in FIG. 11A, the insertion engaging portions 13 include insertion protrusions 11a and 11b provided at the hinge portion side end portions of the external plate portion 10a and the internal plate portion 10b of the cable cover 10 and insertion receiving portions 12a and 12b provided on the printer portion side. As illustrated, for example, in FIG. 11B, at the hinge portion side end portions of the external plate portion 10a and the internal plate portion 10b of the cable cover 10, there are provided base portions 11a1 and 11b1 from which the insertion protrusions 11a and 11b protrude.

The insertion protrusions 11a and 11b and the insertion receiving portions 12a and 12b undergo insertion through movement of the cable cover 10 toward the pivot axis of the hinge portion 3, and undergo detachment through movement of the cable cover 10 away therefrom. In the example illustrated, the insertion protrusions 11a and 11b protrude in a rectangular fashion toward the hinge portions 3, and the insertion receiving portions 12a and 12b are of a recessed configuration.

The arrow A illustrated in FIG. 10 indicates the direction in which the cable cover 10 is detached. As illustrated in FIG. 10, with the scanner portion 1 being open, the cable cover 10 is detached away from the pivot axis of the hinge portion 3 around which the scanner portion 1 is opened and closed. That is, the cable cover 10 is detached in a direction orthogonal to the rotation center of the hinge portions 3.

In this example, the external plate portion 10a of the cable cover 10 is fitted into the cutout 22 of the rear cover 21, and hence the detachment direction A is obliquely upward by a predetermined angle with respect to the horizontal line so that the cable cover 10 may be raised along the vertical end edge 22b and then climb over the upper end corner portion thereof.

When fixing the cable cover 10 in position, the insertion protrusions 11a and 11b of the cable cover 10 are inserted into the insertion receiving portions 12a and 12b, whereby the hinge portion side end portion is supported, and the connector portion side end portion is fixed to the printer portion 2 by a screw 10e. Through the fit-engagement of the insertion protrusions 11 and the insertion receiving portions 12, positioning is effected on the hinge portion side end portion of the cable cover 10 in the vertical direction and the horizontal direction (the direction parallel to the pivot axes of the hinge portions 3).

At the time of removal, one screw 10e of the fixation end portion 7 is detached, and the cable cover 10 is moved away from the hinge portions 3, whereby the insertion protrusions 11 are detached from the receiving portions 12. At this time, the cable cover 10 can smoothly climb over the upper end corner portion of the vertical end edge 22b of the cutout 22 as the cable cover is moved along the arcuate end edge of the connector side end edge 10a3.

Thus, even when the opening/closing angle of the scanner portion 1 is restricted in order to prevent the apparatus from toppling down, the cable cover 10 can be detached easily by drawing it out substantially parallel to the cable 4 and away from the pivot axis of the hinge portion 3.

In the image forming apparatus of the above-mentioned construction, access to the interior of the printer 2 is possible by opening the scanner portion 1, and operations such as replacement of the process cartridge, sheet material jam clearance, and maintenance are performed.

When detaching the cable 4, with the scanner portion 1 being open, the cable cover 10 is first removed, and then the connector 41 of the cable 4 is pulled out of the connector receiving portion 7. When connecting the cable 4, with the scanner portion 1 being open, the connector 41 of the cable 4 is inserted into the connector receiving portion 7, and the cable cover 10 is mounted. Thus, it is possible to attach and detach the cable 4 without removing the exterior components and the peripheral components.

During the operation of attaching/detaching the cable cover 10, it is possible to secure the requisite distance between the cable 4 and the external space by the cable cover 10, thereby preventing damage of the electrical components due to static electricity. Further, the single component, that is, the cable cover 10, enables taking measures against the static electricity in the region from the portion near the pivot axis of the hinge portion 3, around which the scanner portion 1 is opened and closed, to the connector receiving portion 7. Thus, it is possible to achieve an improvement in terms of operability in the operation of attaching/detaching the scanner portion 1, which is advantageous also in terms of cost. Further, also when detaching the cable cover 10, it is possible to remove the cable cover 10 without interfering with the cable 4, thus facilitating the assembly operation.

Third Embodiment

Figure 14:
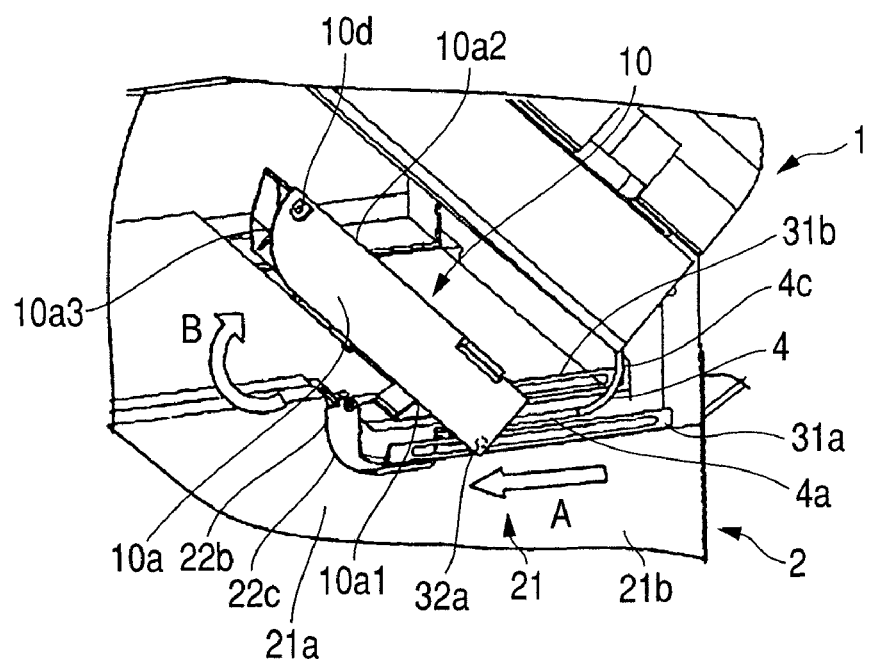
FIG. 14 is a perspective view illustrating the construction of a cable cover used in an image forming apparatus according to a third embodiment.
Figure 15:
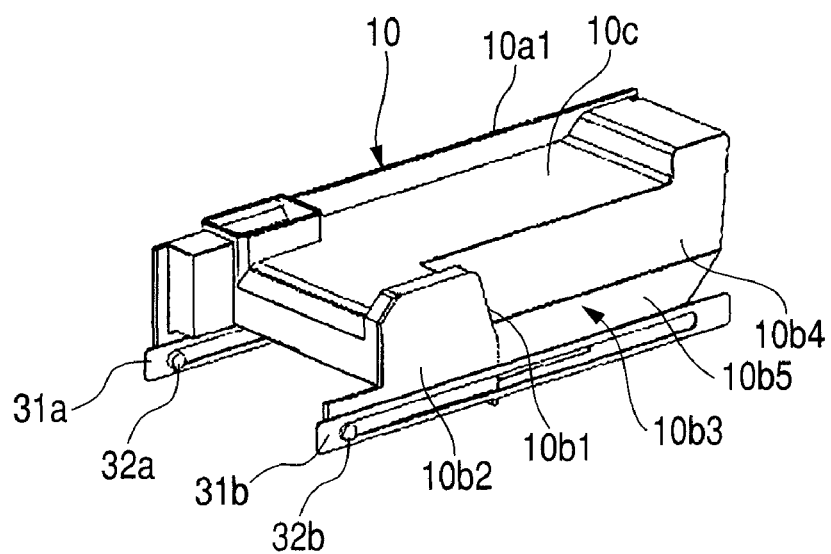
FIG. 15 is a perspective view of the cable cover of FIG. 14 as seen from the opposite side.

FIGS. 14 and 15 illustrate the cable cover support structure of an image forming apparatus according to the third preferred embodiment of the present invention. The construction of the image forming apparatus as a whole is the same as the construction of the first embodiment, so a description thereof is omitted.

The construction of the cable cover 10 is basically the same as the construction of the second embodiment, and hence the following description centers on the support mechanism, and the components that are the same as the components of the above embodiments are indicated by the same reference symbols, and a description thereof is omitted.

In the third embodiment, between the cable cover 10 and the printer portion 2, there are provided a pair of rails 31a and 31b which are provided on the printer portion 2 and which are parallel to each other, and bosses 32a and 32b that are provided on the cable cover 10. The bosses 32a and 32b constitute rail engagement portions engaged so as to be movable along the rails 31a and 31b. The rails 31a and 31b are laid so as to be parallel to each other in a direction orthogonal to the hinge portions 3. The bosses 31a and 31b protrude from the hinge portion side end portions of the external plate portion 10a and the internal plate portion 10b of the cable cover 10, and are movably engaged with longitudinally elongated holes provided in the rails 31a and 31b. The state in which the cable cover 10 has been mounted is the same as the state illustrated in FIGS. 9 and 12, and a fixation portion at the connector side end portion is fixed to the printer portion 2 by a screw.

The arrows A and B in FIG. 14 indicate the directions in which the cable cover 10 is detached. That is, the fixation screw at the connector side end portion of the cable cover 10 is removed, and the cable cover 10 is rotated around the bosses 32a and 32b with the connector side end portion of the cable cover 10 up (as indicated by the arrow B in FIG. 14). At the same time, the bosses 32a and 32b are moved along the rails 31a and 31b away from the pivot axis of the hinge portion 3 (in the direction of the arrow A in FIG. 14).

In this embodiment, the cable cover 10 is moved in two directions, that is, the directions A and B, and hence the embodiment is also applicable to a construction in which the scanner opening/closing angle is relatively small. Further, the boss portions 32a and 32b of the cable cover 10 are guided by the rails 31a and 31b, and hence the cable cover easily reaches the mounting position, which leads to a satisfactory workability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-204011, filed Aug. 6, 2007, Japanese Patent Application No. 2008-065847, filed Mar. 14, 2008, and Japanese Patent Application No. 2008-199677, filed Aug. 1, 2008, which are hereby incorporated by reference herein in their entirety.

What is claimed is:

1. An image forming apparatus comprising:
an image forming portion that forms an image on a sheet material;
an image reading portion that reads an original;
a hinge portion that connects the image reading portion and the image forming portion, wherein the hinge portion includes a pivot axis that pivotably supports the image reading portion so as to allow the image reading portion to be opened and closed relative to the image forming portion; and
a cable including a connector that electrically connects the image reading portion and the image forming portion,
wherein the image forming portion includes a printed board having a board surface parallel to the pivot axis, the board surface extending from the image forming portion toward the image reading portion, the printed board having a connector receiving portion provided on the board surface and serving to effect connection with the connector of the cable, and
wherein the cable is formed with a fold-back portion folded in a direction substantially perpendicular to the pivot axis, in a vicinity of the pivot axis between the image reading portion and the image forming portion, and the cable is formed into a U-shape, and the connector of the cable is connected to the connector receiving portion from a direction substantially perpendicular to the board surface of the printed board.

2. The image forming apparatus according to claim 1, wherein the connector of the cable is connected from a side of the hinge portion to the connector receiving portion.

3. The image forming apparatus according to claim 1, further comprising:
a protective cover for protecting the board surface of the printed board and the connector receiving portion,
wherein the protective cover is formed with an opening portion through which the cable is connected to the connector receiving portion.

4. The image forming apparatus according to claim 1, wherein a part of an image forming portion side of the fold-back portion of the cable and a part of an image reading portion side of the fold-back portion of the cable are offset with respect to one another in a direction along the pivot axis of the hinge portion.

5. The image forming apparatus according to claim 1, further comprising:
a cable cover which covers the connector receiving portion and a part of an image forming portion side of the fold-back portion of the cable connected to the connector receiving portion and which secures a distance between the cable and outside, the cable cover being detachably mountable to the image forming portion,
wherein, in a state where the image reading portion is open with respect to the image forming portion, the cable cover can be detached away from the pivot axis of the hinge portion and along the part of the image forming portion side of the fold-back portion of the cable, and
wherein, in a state where the image reading portion is closed with respect to the image forming portion, attachment/detachment of the cable cover is prohibited.

6. The image forming apparatus according to claim 5, wherein, between the cable cover and the image forming portion, there are provided insertion engaging portions which are engaged with each other by moving the cable cover toward the pivot axis of the hinge portion and which are detached from each other by moving the cable cover away from the pivot axis of the hinge portion.

7. The image forming apparatus according to claim 6, wherein, between the cable cover and the image forming portion, there are provided a rail provided on the image forming portion and a rail engagement portion provided on the cable cover and movably engaged with the rail.

8. The image forming apparatus according to claim 5, wherein the cable cover also serves as an exterior of the image forming apparatus.

9. An image forming apparatus comprising:
an image forming portion that forms an image on a sheet material;
an image reading portion that reads an original;
a hinge portion that connects the image reading portion and the image forming portion, wherein the hinge portion includes a pivot axis that pivotably supports the image reading portion so as to allow the image reading portion to be opened and closed relative to the image forming portion;
a cable including a connector that electrically connects the image reading portion and the image forming portion;
a connector receiving portion serving to effect connection with the connector of the cable, the connector receiving portion being provided on the image forming portion; and
a cable cover, which covers the connector receiving portion and an image forming portion side portion of the cable connected to the connector receiving portion and secures a distance between the cable and outside, the cable cover being detachably mountable to the image forming portion, wherein the cable cover has an elongated shape along the image forming portion side portion of the cable, and the cable cover is provided between the image forming portion and the image reading portion and in a vicinity of the pivot axis in a state in which the cable cover is mounted to the image forming portion, wherein, in a state where the image reading portion is open with respect to the image forming portion, the cable cover can be detached from a main body of the image forming apparatus by moving the cable cover in a direction substantially perpendicular to the pivot axis of the hinge portion, a direction along a longitudinal direction of the cable cover, and a direction away from the pivot axis of the hinge portion.

10. The image forming apparatus according to claim 9, wherein, in a state where the image reading portion is closed with respect to the image forming portion, attachment/detachment of the cable cover is prohibited.

* * * * *